United States Patent [19]

Selman

[11] 4,111,915

[45] Sep. 5, 1978

[54] LITHIUM ALKENOXIDES IN PREPARATION OF FUNCTIONAL LIQUID CONJUGATED DIENE POLYMERS

[75] Inventor: Charles M. Selman, Bartlesville, Okla.

[73] Assignee: Phillips Petroleum Company, Bartlesville, Okla.

[21] Appl. No.: 764,630

[22] Filed: Feb. 1, 1977

Related U.S. Application Data

[63] Continuation of Ser. No. 625,744, Oct. 24, 1975, abandoned.

[51] Int. Cl.$^2$ ............................ C08F 8/08; C08F 8/42; C08F 4/08
[52] U.S. Cl. ........................................ 528/58; 526/20; 526/21; 526/55; 526/175; 526/240; 528/68; 528/75
[58] Field of Search .................. 260/77.5 CR; 526/20, 526/21, 175, 240

[56] References Cited

U.S. PATENT DOCUMENTS

| | | | |
|---|---|---|---|
| 2,856,391 | 10/1958 | Diem .................................. | 260/94.2 |
| 2,951,831 | 9/1960 | Reinhard et al. .................. | 260/80.7 |
| 3,175,997 | 3/1965 | Hsieh ................................. | 260/85.1 |
| 3,280,084 | 10/1966 | Zelinski ............................. | 260/880 |
| 3,287,333 | 11/1966 | Zelmski ............................. | 260/83.7 |
| 3,294,768 | 12/1966 | Wofford ............................. | 260/83.7 |
| 3,317,918 | 5/1967 | Foster ................................ | 260/83.7 |
| 3,331,826 | 7/1967 | Talcott .............................. | 260/94.2 |
| 3,801,554 | 4/1974 | Selman .............................. | 260/83.7 |

FOREIGN PATENT DOCUMENTS

850,894 10/1960 United Kingdom .................... 260/94.2

OTHER PUBLICATIONS

Tetrahedron Letters #5, pp. 325-328, G. Britain-Pergman Press, "Organolithium Additions to Allylic Alcohols" by Crandall, 1969.

J. Pol. Sc. Part A-1 vol. 8, 533-543 (1970) "Effect of Lithium Alkoxide on Polymerization" by Hsieh.

*Primary Examiner*—William F. Hamrock

[57] ABSTRACT

Functional liquid conjugated diene copolymers are prepared from conjugated dienes, or conjugated dienes with monovinyl aromatic hydrocarbon monomers, with lithium salts of alkenols as comonomers. The lithium alkenoxide comonomer can be employed as a comonomer during polymerization of the other monomers, or copolymerized at the end of polymerization of the other monomers. The functional copolymers can be cured with such as the polyisocyanate curing systems.

76 Claims, No Drawings

LITHIUM ALKENOXIDES IN PREPARATION OF FUNCTIONAL LIQUID CONJUGATED DIENE POLYMERS

This is a continuation application of Ser. No. 625,744 filed Oct. 24, 1975, now abandoned.

FIELD OF THE INVENTION

The invention relates to the preparation of polymers of increased functionality. In another aspect, the invention relates to hydroxy functional polymers. In a further aspect, the invention relates to cured polymers.

BACKGROUND OF THE INVENTION

Polymers of conjugated dienes, such as butadiene, or copolymers of conjugated dienes with one or more monovinyl-substituted aromatic hydrocarbons, such as styrene, are widely employed as synthetic elastomeric composition in a variety of applications. Recently, there has been considerable interest in preparing normally liquid polymers, and then curing to a firm gum stock with various curing agents. However, the nature of such stocks, and the ability to make a good cured stock, depends on a number of factors. If a convenient but highly functional liquid polymer could be prepared with a sufficiently high functionality that it could be readily cured to a tight stock, then a true castable rubber would be at hand, simplifying much processing, and open many product applications in forming polymeric products.

In prior art processes, some functionality, of course, has been provided in polymers by converting lithium end groups of a lithium-initiated solution-polymerized polymer to hydroxyl groups. A linear polymer, for example, thus would contain about 1-2 hydroxyl groups per polymer molecule depending on initiation with mono- or dilithio initiators. However, while these limited hydroxyl groups are useful in curing with a variety of curing agents, nevertheless, the quite limited functionality normally available has been a limiting factor in trying to produce a truly castable rubber.

BRIEF DESCRIPTION OF THE INVENTION

I have discovered a novel method to produce novel polymers. The use of lithium alkenoxides, lithium salts of alkenols, as comonomers in the preparation of conjugated diene polymers by the polymerization of conjugated dienes, or of conjugated dienes with monovinyl-substituted aromatic hydrocarbon compounds, results in highly functional liquid polymers. These liquid polymers can be readily cured to firm gum stocks by the use of curing agents such as polyisocyanates.

The lithium alkenoxide can be included with and copolymerized as a comonomer during polymerization of the other monomer or monomers, or copolymerized after polymerization of the other monomer or monomers is substantially complete, so long as prior to termination of the living polymer-lithium.

DETAILED DESCRIPTION OF THE INVENTION

Lithium Alkenoxides

The lithium alkenoxides, otherwise termed lithium salts of alkenols, employed in the process of one aspect of my invention to prepare the polymers of a further aspect of my invention can be respected by the formula:

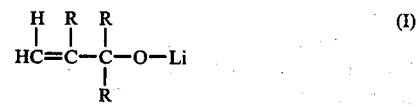

In the above generalized formula, each R is hydrogen, or is a hydrocarbon radical of 1 to 8 carbon atoms, such as alkyl, cycloalkyl, aryl, or a combination radical such as alkaryl, aralkyl, alkylcycloalkyl, or the like. While the number of carbon atoms per molecule does not appear to be a limiting factor as far as operability is concerned, yet for convenience and availability, as well as for solubility in the polymerization diluent, it presently is preferred to employ species having in the range of 3 to 17 carbon atoms per molecule. For this reason, each R group where other than hydrogen should be limited to 1 to 8 carbon atoms per R group.

Exemplary lithium alkenoxides include the lithium salts of allyl alcohol, methallyl alcohol, 1-penten-3-ol, 3-buten-2-ol, 2,3-dimethyl-3-buten-2-ol, 1-undecen-3-ol, 1,1-diphenyl-2-propen-1-ol, 2-phenyl-2-propen-1-ol, 3-phenyl-1-penten-3-ol, 1-hexen-3-ol, 3,4,4-trimethyl-1-penten-3-ol, 2,6-dimethyl-1-octen-3-ol, 2-benzyl-1-phenyl-3-buten-2-ol, 2-cyclopropyl-3-buten-2-ol, and the like, including mixtures.

The lithium salts of alkenols can be prepared by reacting the corresponding alkenol with either lithium metal in the form of wire, ribbon, shot, foil, or suspension, or by reaction with a hydrocarbon lithium compound.

The reaction in the preparation of the lithium salt of alkenol can be conducted by contacting the alkenol with the lithium metal, or with the hydrocarbon lithium compound, under conditions suitable for producing lithium salts of alkenols. The relationship of the reactants should be in the range of about 0.95 to 1.05 gram equivalents of lithium, either as lithium metal or in the hydrocarbon lithium compound, per gram mole of alkenol employed. It is presently not objectionable to have a slight excess of one or other of the reactants, since such does not interfere in the overall polymerization of the monomers. Contacting times can vary widely, such as from about 1 minute or less to upwards of 24 hours or more, presently preferred about 15 minutes to 1 hour, employing moderate temperatures such as of about 0° to 100° C., preferably about 20° to 50° C., and conducting the reaction in the presence of a diluent substantially inert to the reactant, preferably a hydrocarbon diluent such as those employed for solution polymerization with lithium initiators.

Hydrocarbon lithium compounds employed in the preparation of the lithium alkenoxides can be described by the formula $R'(Li)_x$ in which $R'$ represents the hydrocarbon radical. Such a hydrocarbon radical has a valence of x and is a saturated aliphatic, saturated cycloaliphatic, or aromatic radical. The integer x has a value of 1 to 4. The R group presently is not limited by the number of carbon atoms as far as operability is concerned, though about 1 to 20 carbon atoms per molecule presently are preferred because of availability and reactivity.

Exemplary hydrocarbon lithium compounds include methyllithium, isopropyllithium, n-butyllithium, tert-butyllithium, n-decyllithium, phenyllithium, p-tolyllithium, cyclohexyllithium, 1,20-dilithioeicosane, 1,3,5- trilithiopentane, 1,2,4,6-tetralithiocyclohexane, and the like, including mixtures. n-Butyllithium presently is preferred because of convenience, availability and reactivity.

The lithium alkenoxides can be prepared separately from the polymerization system, and transferred to the polymerization reaction means without separation from the diluent, or can be prepared directly in the polymerization zone. Water and air preferably should be excluded, since moisture, oxygen, carbon dioxide, and the like, are known to be deleterious to lithium compounds. It should be noted that the lithium alkenoxides as described hereinabove have no appreciable initiation properties relative to conjugated dienes, monovinyl-substituted aromatic hydrocarbons. The lithium alkenoxides, for this reason, have been described by me as comonomers, and thus are introduced into the reaction zone or polymerization zone along with the other monomers, or after polymerization of the other monomers, and must consequently be contacted with a suitable lithium-based initiator under usual polymerization conditions.

Polymerizable Monomers

Monomers to be polymerized in the process of my invention are the conjugated dienes, alone or with the monovinyl-substituted aromatic hydrocarbons, known to polymerize with hydrocarbon lithium initiators.

The conjugated dienes can be selected from one or more of the polymerizable hydrocarbon conjugated dienes, such as those from 4 to 12 carbon atoms per molecule, more usually for commercial purposes those having from 4 to 8 carbon atoms per molecule, most preferably 1,3-butadiene and isoprene for commercial availability. Other exemplary conjugated dienes include piperylene, 2,3-dimethylbutadiene, 1,3-hexadiene, 2,4-octadiene, 2-phenyl-1,3butadiene, and the like, alone, or in admixture.

Monovinyl-substituted aromatic hydrocarbon monomers include those broadly known to copolymerize with conjugated dienes in polymerization systems initiated with lithium-based initiators. Generally, the monovinyl-substituted aromatic hydrocarbon monomers include those of 8 to 20 carbon atoms per molecule, more usually for commercial purposes those of 8 to 12 carbon atoms per molecule, and preferably for commercial availability of styrene. Exemplary monovinyl-substituted aromatic hydrocarbon monomers include alpha-methylstyrene, m-vinyltoluene, p-tert-butylstyrene, 1-vinylnaphthalene, 4-ethyl-1-vinylnaphthalene, 6-isopropyl-4-methyl-1-vinylnaphthalene, 4-cyclohexylstyrene, 4-dodecylstyrene, 2-ethyl-4-benzylstyrene, and the like, alone, or in admixture.

It is presently preferred, wherein a conjugated diene is to be copolymerized with a monovinyl-substituted aromatic hydrocarbon monomer, to employ a sufficient proportion of conjugated diene that the polymerization represents a preponderance of the conjugated diene, relative to the total monomers present. Presently, more preferred are those polymerizations wherein the conjugated diene represents at least about 50 percent by weight of total polymerizable monomers, so as to prepare ultimately a substantially rubbery product rather than a thermoplastic product.

The relative proportion of lithium alkenoxide comonomer employed in conjunction with the conjugated diene, or conjugated diene plus monovinyl-substituted aromatic hydrocarbon, should be in the range of about 0.1 to 6 parts by weight per 100 parts by weight of total monomers, with a range of about 1 to 6 parts by weight preferred, and more preferred is a range of about 1 to 4. It presently appears that an undesirable degree of retardation of overall polymerization rate may result if amounts of the lithium alkenoxide comonomer in excess of about 6 parts by weight per 100 parts by weight of total monomers should be employed.

Polymerization Conditions

Polymerization temperatures and pressures normally employed for lithium-initiated solution polymerization systems can vary widely as is well known in the art. Typically, polymerization temperatures employed can range from about −50° C. to +200° C., more usually in the range of about +30 to +100° C., and presently preferred is the range of about +40 to +60° C., since it is useful to prepare desirable polymers employing preferred monomers and other conditions. The time can range widely, influenced to some extent by polymerization temperature employed. Times exemplarily can be in the range of about 0.5 to 15 hours. Polymerizations preferably are conducted under pressures sufficient to maintain the reactants and diluents substantially in the liquid state.

Polymerizations are conducted in a hydrocarbon diluent, such as those of about 4 to 12 carbon atoms per molecule, alone or admixtures. Such diluents include typically pentane, hexane, cyclohexane, isooctane, benzene, toluene, alone or in admixture. Amounts of diluent can vary as widely as may be convenient, such as about 100 to 2000 parts by weight per 100 parts by weight of total monomer employed.

Polymerization Initiator

Initiators employed for polymerization of the monomers are those suitable for polymerization of conjugated dienes and monovinyl-substituted aromatic hydrocarbon monomers generally in solution polymerization systems. It presently is preferred that the polymers be predominantly linear polymer molecules containing a lithium atom at the end thereof, more preferably polymers which are linear and contain a lithium atom at each end. However, it is within the scope of my invention to employ the multilithium initiators such that the resulting polymer prior to termination contains several lithium atoms per molecule, since these initiators result in predominantly branched polymer molecules containing a lithium atom at the end of each branch.

Suitable initiators include those which can be represented by the general formula R"(Li)$_y$. R" is a hydrocarbon radical which can be aliphatic, cycloaliphatic, aromatic, or a combination radical. R" has a valence equal to $y$. The integer indicator $y$ can range from 1 to 4. R" presently is not limited in the number of carbon atoms as far as operability is concerned; but, presently for convenience and availability, R" will usually have a value of 1 to 20 carbon atoms per radical, though this can vary considerably, such as in the case of very useful adducts such as described in U.S. Pat. No. 3,287,333. The presently most preferred initiators include the R"(Li)$_2$ initiators, and most preferred presently are the adducts such as particularly exemplified by the lithium-methylnaphthalene-isoprene adduct described in U.S. Pat. No. 3,287,333,

EXAMPLE I.

Typical species of the lithium initiators which can be employed include methyllithium, isopropyllithium, n-butyllithium, phenyllithium, 1,4-dilithiobutane, 1,2-dilithio-1,2-diphenylethane, 1,4-dilithionaphthalene, 1,4-dilithio-2-methylbutane, 1,3,5-trilithiopentane, 1,2,4,8-tetralithioeicosane, 1,3,5,8-tetralithiodecane, and the like, as well as the adducts mentioned above.

The amount of initiator employed can vary widely depending upon the desired molecule weight of the polymer, though according to my invention the amount of initiator should be regulated so as to produce a normally liquid polymer. The amount of lithium initiator presently recommended is in the range of about 20 to 150 milliequivalents of lithium per 100 parts by weight of total polymerizable monomer present, and this is based on conjugated diene plus lithium alkenoxide, or conjugated diene plus monovinyl-substituted aromatic hydrocarbon plus lithium alkenoxide. The amount of lithium initiator employed, of course, is exclusive of any hydrocarbon lithium compound employed as the reagent to prepare my lithium alkenoxide comonomers. Should the preparation thereof include any inadvertent slight excess of hydrocarbon lithium compound employed in making up the lithium alkenoxide, particularly where the lithium alkenoxide is prepared by reaction of suitable components and this reaction mixture is then employed as a comonomer, the slight excess of hydrocarbon lithium compound becomes a part of the initiator. In general, the lithium initiator as such is introduced into the polymerization zone only after total monomers and diluent are present.

As discussed hereinabove, the lithium alkenoxide can be employed in conjunction with, that is, in admixture with, the other monomer or monomers, or can be added as a separate monomer at the end of polymerization of the other monomer or monomers.

At the conclusion of the polymerization reaction, the thus-prepared living monomer containing carbon-lithium end groups from the polymerization initiator, as well as oxygen-lithium groups from the so incorporated lithium alkenoxides, is treated with a reagent sufficient to and effective to convert the lithium-carbon groups to oxygen-lithium groups. Such reagents are the alkylene oxides of such as 2 to 6 carbon atoms per molecule. Typically, these include the presently preferred ethylene oxide, propylene oxide, as well as 1,2-epoxy-2-methylpropane, 1,2-epoxy-2,3-dimethylbutane and 1,2-epoxyhexane. The alkylene oxide generally is employed in the range of about 1 to 2, more preferably 1.25 to 1.5 moles of alkylene oxide per equivalent of lithium in the lithium-based initiator employed in the polymerization.

While the alkylene oxide can be added directly to the polymerization zone, it presently is preferred to employ of the order of about 2 to 20 parts by weight per 100 parts by weight of total monomers of an ether such as diethyl ether, tetrahydrofuran, or the like, prior to addition of the alkylene oxide so as to maintain a fluid system for convenience in handling of the reactants. The treatment with the alkylene oxides can be conducted for a sufficient time and at a suitable temperature necessary to convert substantially all of the carbon-lithium groups to carbon-oxygen-lithium groups. Suitable exemplary times range from about 1 minute to 24 hours, and the exemplary temperatures range from about 30° to 100° C., sufficient to substantially complete the reaction.

Thereafter, the so-produced highly functional liquid polymers can be isolated by means known to the art. The polymerization reaction mixture, after substantially complete polymerization of the monomers, can be treated with a reagent, such as water, or more conveniently with a lower alcohol, such as isopropanol, effective to convert the oxygen-lithium groups to the stable and desired hydroxyl groups, and also to fluidize the system. Acidification with such as aqueous hydrochloric acid also similarly converts the carbon-lithium groups, followed by washing with water until neutral. Addition of known stabilizers or antioxidants such as butylated hydroxytoluene and 2,2'-methylenebis(4-methyl-6-t-butylphenol) can also be employed, preferably and conveniently before recovery of the polymer. Addition of the alcohol or acidification or the like, also tends to coagulate the copolymer, so that the coagulated polymer can be recovered by centrifugation, filtering, and the like. The recovered product can be dried to complete the recovery process.

Alternatively, the polymer cements, i.e., the copolymer dissolved in hydrocarbon diluent, obtained after the alkylene oxide treatment, can be titrated with aqueous acid such as hydrochloric acid to the neutral point, filtered to remove lithium chloride, and then dried to obtain the desired functional copolymer.

The thus-produced highly functional hydroxy-containing liquid copolymers can then be cured. Curing preferably employs a polyisocyanate to produce a urethane type product.

Many well-known polyisocyanates of general formula $R(NCO)_x$ wherein R is a hydrocarbyl radical of valence $x$ having up to about 20 carbon atoms and wherein $x$ is an integer having the value of from 2 to 4 are useful in the curing of the invention polymers. Examples of commercially available diisocyanates are 2,4-tolylene diisocyanate (TDI), diphenylmethane diisocyanate (MDI), hexamethylenediisocyanate, and the like. Aryl diisocyanates, such as TDI and MDI, are preferred. The isocyanates, presently preferred, are the diisocyanates, reacted with a polymer to convert the polymer hydroxyl groups into urethane-type linkages.

If an excess of polyisocyanate is used, a chain extender, such as a polyol, can be added to convert excess isocyanate groups into urethane-type linkages.

Many chain extenders are known in the art and are sometimes useful in the curing procedure for the polymers of this invention. Examples of commercially available chain extenders include 1,4-butanediol, 2-ethyl-1,3-hexanediol, trimethylolpropane, triisopropanolamine, N,N-bis(2-hydroxypropyl)-aniline, 3,3'-dichlorobenzidine and the like. Especially preferred in the present invention are the diols, such as N,N-bis(2-hydroxypropyl)aniline.

The chain extenders, preferably diols, normally are used in amounts ranging from 0 to about 5, preferably about 1 to 3, equivalents of hydroxy per equivalent of polymer hydroxy groups. The polyisocyanates, preferably diisocyanates, are normally employed in amounts ranging from about 1 to 1.15 and preferably 1 to 1.05 equivalents of isocyanate per equivalent of total hydroxy (polymer hydroxy plus chain extender hydroxy).

It may sometimes be desirable to include accelerators in the curing system which are known in the art to accelerate the reaction of isocyanates with hydroxyl groups. Such accelerators include dibutyltin dilaurate, stannous octoate, triethylene diamine, and the like. Accelerators usually are used in amounts ranging from 0 to about 0.5, preferably about 0.15 to 0.25, parts by weight per one hundred parts by weight polymer.

Due to the exothermic nature of the isocyanate-hydroxy reaction, it may be desirable or necessary to control the temperature of the mixture during such reaction by means of an external cooling system. It generally is desirable to maintain the temperature of the reacting mixture below about 80° to 100° C. in order to avoid completely curing the polymer prior to introduction of the partially cured mass into the desired mold.

The so-reacted polymer actually is an incompletely cured polymer, which is exceedingly useful for molding to a completely cured polymer by suitable heat and pressure, which completes the conversion into valuable firm rubbery gum stocks. The subsequent molding and complete curing of the polymer can be carried out at any temperature and pressure for any time which results in the desired product. Currently, particularly useful for such molding operations of the partially cured polymer are temperatures of about 93° to 121° C. (200° to 250° F.) at pressures of 15,000 to 20,000 psig for times of such as about 1 to 2 hours.

The cured products are particularly useful in a wide variety of applications such as gaskets, tubing, belting, shoe soles, adhesives, sealants and the like and including any suitable compounding recipe to provide cast rubber articles.

Examples

Examples following are designed to assist in an understanding of my invention. Particular species employed, amounts, ratios, should be considered as exemplary, and not as limited of the scope of my invention.

EXAMPLE I

The following comparative Runs 1 to 4 show the preparation of polymers of 1,3-butadiene using a dilithium initiator and terminating the resulting living polymer with propylene oxide.

Table I gives the polymerization recipes and reaction conditions for Runs 1 to 4.

Table I

| Run No. | CH$^a$, ml | Bd$^b$, gm | LIMI-B$^c$ mmoles | Pzn Hr | Pzn °C | THE$^d$, ml | PO$^e$, ml | Treatment Hr | Treatment °C |
|---|---|---|---|---|---|---|---|---|---|
| 1 | 425 | 40 | 10 | 2 | 50 | 3 | 3.5 | 16 | 50 |
| 2 | 450 | 40 | 10 | 2 | 50 | 3 | 3.5 | 16 | 50 |
| 3 | 450 | 40 | 12 | 1.5 | 50 | 5 | 7 | 16 | 50 |
| 4 | 475 | 40 | 12 | 4 | 50 | 5 | 7 | 16 | 50 |

$^a$Cyclohexane (CH)
$^b$Butadiene (Bd)
$^c$Dilithium initiator, a lithium-methylnaphthalene-isoprene adduct, prepared in accordance with U.S. Pat. No. 3,287,333, Example I.
$^d$Tetrahydrofuran (THF)
$^e$Propylene oxide (PO)

To a nitrogen purged reactor pressured to 30 psig nitrogen were charged the above-stated amounts of cyclohexane, butadiene and initiator, in that order. The reactor was maintained at 50° C. for the designated time with constant stirring. The tetrahydrofuran and propylene oxide were then added in that order with vigorous agitation between additions. The reactor was maintained at 50° C. for 16 hours with constant stirring. The polymerization mixture then was fluidized with isopropanol, acidified with dilute hydrochloric acid, washed with water until neutral, treated with 0.5 part by weight per one hundred parts by weight total monomers of 2,2'-methylene-bis(4-methyl-6-t-butylphenol) and heated to steam temperature under a nitrogen stream to remove volatiles.

Table II contains the recovered amounts and characterization data of the resultant polymers.

Table II

| Run No. | Recovery Gm | Recovery % Theory | Visc.$^a$ | Hydroxy$^b$ wt % | Hydroxy$^b$ #/molecule | HI$^c$ | M$_w^d$ | M$_n^d$ |
|---|---|---|---|---|---|---|---|---|
| 1 | 44.4 | 100 | 88 | 0.69 | 1.9 | 1.37 | 6400 | 4700 |
| 2 | 45.1 | 102$^e$ | 84 | 0.71 | 2.0 | 1.42 | 6700 | 4700 |
| 3 | 49 | 106$^e$ | 56 | 0.89 | 2.0 | 1.40 | 5300 | 3800 |
| 4 | 46.9 | 100 | 48 | 0.85 | 1.8 | 1.34 | 4900 | 3700 |

$^a$Viscosity (poise) at 25.8° C. Determined using Brookfield Viscometer, Model RVF, No. 7 spindle.

$^b$Wt. % hydroxyl determined as in Anal. Chem. 31, 1808 (1959). #/Molecule = $\frac{M_n \times \text{Wt. \% OH}/100}{17}$ $^c$Heterogeneity Index. Calculated as M$_w$/M$_n$.

$^d$Weight average molecular weight and number average molecular weight determined by gel permeation chromatography in accordance with the method of Kraus and Stacy, J. Poly. Sci. A-2, 657 (1972).

$^e$Possibly not dry.

As was expected, the polymers resulting from capping the living polymer of butadiene initiated with a dilithium initiator with propylene oxide contained approximately two hydroxyl groups per molecule.

EXAMPLE II

The following invention runs (Runs 5 to 15) illustrate the use of the lithium salt of allyl alcohol as a comonomer with butadiene in the preparation of polymers using a dilithium initiator and termination of the resulting living polymers with propylene oxide.

| Recipe and Charge Order | |
|---|---|
| Cyclohexane, ml | var. |
| Allyl alcohol (AA), mmole | var. |
| n-Butyllithium (NBL), mmole | var. |
| Contact at 30° C. for variable time | |
| Butadiene (Bd), gm | var. |
| LIMI-B, mmole | var. |
| Polymerization - variable time and temperature | |
| Tetrahydrofuran (THF), ml | var. |
| Propylene oxide (PO), ml | var. |
| Contact at 50° C. for 16 hours. | |

Table III shows the polymerization variables.

Table III

| Run No. | CH, ml | AA gm | AA mmole | NBL mmole | Salt Prep, Hr. | Bd gm | LIMI-B mmole | Pzn Hr. | Pzn °C | THF, ml | PO, ml |
|---|---|---|---|---|---|---|---|---|---|---|---|
| 5 | 450 | 0.7 | 12 | 12 | 1 | 40 | 12 | 1 | 50 | 5 | 7 |
| 6 | 450 | 0.7 | 12 | 12 | 1 | 40 | 12 | 2 | 50 | 5 | 7 |
| 7 | 450 | 0.7 | 12 | 12 | 1 | 40 | 12 | 4 | 50 | 5 | 7 |
| 8 | 450 | 0.7 | 12 | 12 | 1 | 40 | 12 | 1 | 70 | 5 | 7 |
| 9 | 450 | 0.7 | 12 | 12 | 1 | 40 | 12 | 2 | 70 | 5 | 7 |
| 10 | 450 | 0.6 | 10 | 10 | 0.5 | 40 | 10 | 2 | 50 | 3 | 3.5 |
| 11 | 450 | 0.6 | 10 | 10 | 0.5 | 40 | 10 | 4 | 50 | 3 | 3.5 |
| 12 | 450 | 0.6 | 10 | 10 | 0.5 | 40 | 10 | 8 | 50 | 3 | 3.5 |
| 13 | 200 | 1 | 18 | 18 | 0.5 | 20 | 6.45 | 2 | 50 | 5 | 5 |
| 14 | 200 | 0.7 | 12 | 12 | 0.5 | 20 | 6.45 | 2 | 50 | 5 | 5 |
| 15 | 200 | 0.35 | 6 | 6 | 0.5 | 20 | 6.45 | 2 | 50 | 5 | 5 |

Runs 5 to 15 were conducted as follows: To a nitrogen purged reactor which was pressured to 30 psig with nitrogen were added the cyclohexane, allyl alcohol, and n-butyllithium. The mixture was stirred at 30° C. for the designated time. After addition of butadiene and initiator, the reactor was maintained at the designated temperature for the prescribed time with constant stirring. THF and PO were then added with agitation between additions, followed by continued heating at 50° C. for 16 hours. Workup was as described in Example I. The polymers recovered were characterized with data as recorded in Table IV.

Table IV

| Run No. | Recovery Gm | Recovery % Theory | Visc. | Hydroxyl Wt. % | Hydroxyl #/molecule | HI | $M_w$ | $M_n$ |
|---|---|---|---|---|---|---|---|---|
| 5 | 45.2 | 98 | 74 | a | — | 1.44 | 5400 | 3800 |
| 6 | 46.2 | 100 | 76 | 1.18 | 2.6 | 1.49 | 5700 | 3800 |
| 7 | 46.0 | 99 | 78 | a | — | 1.47 | 5600 | 3800 |
| 8 | 45.6 | 98.5 | 64 | 1.12 | 2.6 | 1.45 | 5600 | 4000 |
| 9 | 44.6 | 96.5 | 68 | 1.10 | 2.5 | 1.48 | 5700 | 3800 |
| 10 | 44.8 | 100 | 120 | 0.95 | 2.8 | 1.43 | 7200 | 5100 |
| 11 | 44.8 | 100 | 118 | 0.95 | 2.7 | 1.45 | 7100 | 4900 |
| 12 | 44.8 | 100 | 130 | 0.93 | 2.7 | 1.50 | 7400 | 5000 |
| 13 | 20.1 | 92 | 120 | 1.34 | 2.7 | 1.85 | 6300 | 3400 |
| 14 | 18.2 | 85 | 110 | 1.22 | 2.9 | 1.58 | 6300 | 4000 |
| 15 | 21.9 | 100 | 58 | 1.06 | 2.2 | 1.42 | 4900 | 3500 | a Not determined

The data in Table IV indicate that the recovered polymers have more hydroxyls per molecule than observed in the prior art process of Example I. Thus, it is concluded that the lithium salt of allyl alcohol was incorporated as a comonomer in the polymer.

It should be further noted that the presence of lithium allyloxide resulted in higher viscosity and increased molecular weight of the resultant polymers compared to the controls of Example I, possibly indicating that the salt serves as a slow polymerization terminator, i.e., a slow poison.

EXAMPLE III

The following comparative Runs 16 and 17 and inventive Run 18 illustrate the curing of some of the polymers prepared as described in Examples I and II and a commercial hydroxy terminated, difunctional, liquid polybutadiene using a urethane-type curing system based on 2,4-tolylene diisocyanate.

| Recipe | Amount |
|---|---|
| Polymer | 35 gm |
| Dibutyltin dilaurate (DBTDL) | 0.079 gm |
| 2,4-Tolylene diisocyanate (TDI) | var. |
| N,N-bis(2-hydroxypropyl)aniline | var. |

Table V shows the amounts of components and the mix conditions.

Table V

| Cure Run No. | Polymer Run No. | Polymer Gm | $OH^a$ | TDI mmole | TDI Min | TDI $Temp^b$ | Diol mmole | Diol Min | Diol $Temp^b$ |
|---|---|---|---|---|---|---|---|---|---|
| 16 | 1 | 17.5 } | 14 | 42.5 | 30 | 36 | 35.5 | 8.5 | 70 |
|  | 2 | 17.5 } |  |  |  |  |  |  |  |
| 17 | c | 35 | 16 | 40 | 30 | 41 | 32 | 3 | 77 |
| 18 | 10 | 11.67 } | 19.2 | 42.5 | 30 | 40 | 32.9 | 6 | 67 |
|  | 11 | 11.67 } |  |  |  |  |  |  |  |
|  | 12 | 11.67 } |  |  |  |  |  |  |  |

$^a$Milliequivalents of hydroxyl contained in 35 gm polymer.
$^b$Final temperature in ° C of mixture at end of specified time.
c Commercial hydroxy-terminated polybutadiene having the following characterization data: $M_n$ = 4700, wt. % OH = 0.80, # hydroxyls/molecule = 2.2.

The polymers to be cured were degassed at 105° to 110° C. for 0.5 hour at 8 to 10 torr. After cooling to 35° C. the vaccum was relieved with dry nitrogen. The DBTDL was mixed into the polymer and degassing at 30° to 35° C. and 50 torr was resumed for 5 minutes. The diisocyanate was mixed into the polymer and the 50 torr vacuum was restored. A temperature increase was observed as noted in Table V as the exothermic reaction occurred between the diisocyanate and the polymer hydroxyls for the specified time interval. After said exothermic reaction subsided and the specified time was achieved, the chain extender (diol) was added and 50 torr vacuum was restored. A rapid temperature increase was observed as noted in Table V after which the reactor was opened to the air and the partially cured polymer was placed in a mold. Molding the polymers at 107° C. (225° F.) for 1.5 hr. at 16,000 psig gave firm gumstocks, the characterization data of which are given in Table VI.

Table VI

| Run No. | Gel %[a] | Swell Index[a] | Tensile[b] psig | Elong, %[b] | 300% Modulus[b], psig | Shore A[c] Hardness | Tear[d], pi |
|---|---|---|---|---|---|---|---|
| 16 | 0 | — | 170 | 140 | 150[e] | 34 | 15 |
| 17 | 73 | 16 | 1410 | 575 | 950 | 56 | f |
| 18 | 85 | 14 | 1575 | 495 | 855 | 53 | 130 |

[a]Determined as in U.S. Pat. No. 3,135,716, Column 16
[b]ASTM D-412-66
[c]ASTM D-2240-68
[d]ASTM D-624-54, Die A
[e]Measured at 100% elevation
f Not determined The above data demonstrate a more tightly cured polymer in the inventive Run 18 as compared to prior art polymers in Runs 16 and 17, as evidenced by higher gel content and tensile strength and lower swell index in the inventive run. The data for Runs 16 and 17 show that the final properties are very sensitive to curing formulation and conditions and suggest that more carefully controlled formulations and conditions may be necessary to show larger effects attributable to the increased functionality (hydroxyls/molecule) of the invention polymers.

EXAMPLE IV

The following comparative Run 19 and inventive Runs 20 and 21 illustrate the curing of some of the polymers prepared as described in Examples I and II using a urethane-type curing system based on a commercial diisocyanate structurally similar to diphenylmethane diisocyanate.

| Recipe | Amount |
|---|---|
| Polymer | 35 gm |
| DBTDL | 0.079 gm |
| Isonate 143L | 42.5 mmole |
| N,N-bis(2-hydroxypropyl)aniline | var. |

Table VII shows the amounts of components and the mix conditions.

Table VII

| Cure Run No. | Polymer Run No. | Polymer Gm | Polymer OH[a] | Isonate Mix Min. | Isonate Mix Temp. | Diol mmole | Diol Min. | Diol Temp. |
|---|---|---|---|---|---|---|---|---|
| 19 | 3 | 18 | 17 | 30 | 41 | 33.8 | 1 | 68 |
|  | 4 | 17 |  |  |  |  |  |  |
| 20 | 6 | 35 | 24.4 | 45 | 44 | 30.3 | 0.5 | 65 |
| 21 | 5 | 8.75 |  |  |  |  |  |  |
|  | 6 | 8.75 |  |  |  |  |  |  |
|  | 8 | 8.75 | 23.6 | 45 | 43 | 30.7 | 1 | 73 |
|  | 9 | 8.75 |  |  |  |  |  |  |

The procedure for mixing, curing and molding the above-described formulations was as described in Example III with the appropriate differences listed in the Recipe and Table VII. Characterization of the molded and cured gums are given in Table VIII.

Table VIII

| Run No. | Gel % | Swell Index, % | Tensile, psig | Elong., % | 300% Modulus, psig | Shore A Hardness | Tear, pi |
|---|---|---|---|---|---|---|---|
| 19 | 88 | 15 | 1270 | 300 | 1240 | 59 | 110 |
| 20 | 94 | 7 | 1655 | 210 | — | 77 | 140 |
| 21 | 93 | 9 | 1310 | 210 | — | 72 | 240 |

These data demonstrate the formulation of more tightly cured inventive polymers in Runs 20 and 21 as compared to prior art polymer in Run 19, as evidenced by higher gel content and tensile strength and lower swell index in the inventive runs. As also described in the conclusions for Example III, more carefully controlled conditions may be necessary to show larger effects attributable to the increased functionality (hydroxyls/molecule) of the inventive polymers.

EXAMPLE V

The following inventive run (Run 22) illustrates the use of the lithium salt of allyl alcohol added terminally to living polymer prepared from butadiene using a dilithium initiator and subsequent addition of propylene oxide to living polymer.

Comparative Run 23 shows preparation of a prior art polymer prepared from butadiene using a dilithium initiator and subsequent propylene oxide addition.

| Recipe and Charge Order | Inventive Run 22 | Comparative Run 23 |
|---|---|---|
| Cyclohexane, ml | 425 | 425 |
| Butadiene, gm | 40 | 40 |
| LIMI-B, mmole | 10 | 10 |
|  | Contact at 50° C. for 1.25 hour | |
| Lithium Allyloxide[a], mmole | 10 | 0 |
|  | Contact at 50° C. for 1.75 hour | |
| Tetrahydrofuran, ml | 3 | 3 |
| Propylene oxide, ml | 5 | 5 |
|  | Contact at 50° C. for 16 hours | |

[a]Prepared by contacting 10 millimoles (0.68 ml) allyl alcohol and 10 millimole n-butyllithium in 75 ml cyclohexane at 30° C. for 16 hours. Charged to polymerization reactor as a slurry.

The above-described runs were conducted under nitrogen atmosphere using the materials, times and temperatures specified in the Recipe and Charge Order. The resulting polymerization mixtures were fluidized with 3 ml of 1/1 (volume basis) isopropanol/dilute aqueous hydrochloric acid, acidified with dilute aqueous hydrochloric acid, washed with water until neutral, treated with 0.5 part by weight 2,2'-methylene-bis(4-methyl-6-t-butylphenol) and then heated to steam temperature under a nitrogen stream to remove volatiles.

Table IX contains the characterization data of the resultant polymers.

Table IX

| Run No. | Visc. | Wt. % | Hydroxy #/Molecule | HI | $M_w$ | $M_n$ |
|---|---|---|---|---|---|---|
| 22 | 96 | 0.67 | 1.9 | 1.31 | 6900 | 4800 |
| 23 | 88 | 0.53 | 1.5 | 1.29 | 7000 | 4800 |

These data indicate that the recovered inventive polymer of Run 22 possessed an average of more hydroxyl groups per molecule than the comparative polymer prepared in Run 23.

EXAMPLE VI

The following Runs 25 and 27 of the invention and comparative Runs 24 and 26 illustrate the curing of the polymers prepared in Example V using urethane-type curing system based on a commercial diisocyanate structurally similar to diphenylmethane diisocyanate.

| Recipe | |
|---|---|
| Polymer | 35 gm |
| Dibutyltin dilaurate | 0.079 gm |
| Isonate 143 L[a] | var. |
| N,N-Bis(2-hydroxypropyl)aniline | var. |

[a] A mixture of isomers structurally similar to diphenylmethane diisocyanate.

Table X shows the amounts of components and the mix conditions.

Table X

| Cure Run No. | Polymer Run No. | OH | Isonate 143 L Mmole | Min | Temp | Diol Mmole | Min | Temp |
|---|---|---|---|---|---|---|---|---|
| 24 | 23 | 11.7 | 23.4 | 45 | 45 | 17.5 | 1.5 | 63 |
| 25 | 22 | 14.6 | 29.2 | 45 | 48 | 21.9 | 1.0 | 70 |
| 26 | 23 | 11.7 | 29.2 | 45 | 47 | 21.9 | 1.0 | 71 |
| 27 | 22 | 14.6 | 23.4 | 45 | 55 | 17.5 | 1.0 | 67 |

The procedure for mixing, curing and molding the above-described formulations was as described in Example III with appropriate differences listed in the Recipe and Table X. Characterization of the molded and cured gums are given in Table XI.

Table XI

| Run No. | Gel, % | Swell Index, % | Tensile, psig | Elong., % | 100% Modulus psig | Shore A Hardness | Tear, Pi |
|---|---|---|---|---|---|---|---|
| 24 | 9 | 49 | 300 | 150 | 150 | 46 | 90 |
| 25 | 69 | 11 | 650 | 210 | 225 | 48 | 80 |
| 26 | 79 | 15 | 590 | 225 | 200 | 42 | 100 |
| 27 | 80 | 15 | 540 | 280 | 150 | 38 | 65 |

The data in Table XI show that more tightly cured and higher strength gums in the inventive runs than in the comparative runs result from higher hydroxyl content of inventive polymers. Comparison of Run 24 with 27 and of Run 25 with 26 gives comparisons between inventive and comparative polymers at equal urethane contents showing higher strengths and tighter cures for inventive polymers. A comparison of the data from Runs 25 and 27 also shows that for inventive polymers, gums of improved strength were obtained by varying the amount of urethane employed to correspond to the higher hydroxyl content of the inventive polymers.

The disclosure, including data, illustrates the value and effectiveness of my invention. The examples, the knowledge and background of the field of the invention and general principles of chemistry and other applicable sciences, have formed the basis from which the broad descriptions of the invention including the ranges of conditions and the generic groups of operant components have been developed, which have formed the basis for my claims here appended.

I claim:
1. A process which comprises the steps of:
    (a) copolymerizing (A) at least one polymerizable hydrocarbon conjugated diene, or at least one polymerizable hydrocarbon conjugated diene with at least one polymerizable hydrocarbon monovinyl-substituted aromatic compound monomer, with (B) at least one polymerizable lithium alkenoxide comonomer, under solution polymerization conditions including polymerization temperatures and pressures employing a hydrocarbon lithium initiator, wherein said lithium alkenoxide comonomer is employed in the range of about 0.1 to 6 parts by weight per 100 parts by weight of total monomers, and wherein said hydrocarbon lithium initiator is employed in a range of about 20 to 150 milliequivalents of lithium per 100 parts by weight of total monomers, thereby preparing a normally liquid copolymer,
    (b) treating said normally liquid copolymer from said step (a) with an effective amount of an alkylene oxide,
    (c) treating said liquid alkylene oxide treated copolymer with an effective amount of one or more of water, acid, or lower alcohol, thereby preparing a hydroxy functional liquid copolmer,
    (d) partially curing said hydroxy functional liquid polymer with a polyisocyanate/polyol curing system, and
    (e) molding said polyisocyanate/polyol cured polymer at effective temperatures and pressures, thereby producing a molded product.
2. A process according to claim 1 wherein said lithium alkenoxide comonomer is represented by

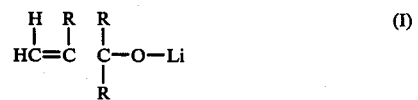

wherein each R is hydrogen, or is a hydrocarbon radical containing 1 to 8 carbon atoms, and is alkyl, cycloalkyl, aryl, or a combination thereof, said conjugated diene monomer contains 4 to 12 carbon atoms per molecule, and, where present, said monovinyl-substituted aromatic compound monomer contains 8 to 20 carbon atoms per molecule.

3. A process according to claim 1 wherein said lithium alkenoxide comonomer is charged to said solution polymerization at least one of prior to initiation, prior to substantial completion of said polymerization, or added terminally after polymerization of said conjugated diene or of said conjugated diene and monovinyl-substituted aromatic hydrocarbon monomer.

4. A process according to claim 3 wherein said lithium alkenoxide comonomer is added terminally after polymerization of other monomer or monomers and prior to termination of lithium activity.

5. A process according to claim 2 wherein said lithium alkenoxide is prepared in situ by reacting an alkenol with lithium metal or with a hydrocarbon lithium compound $R'(Li)_x$ wherein R is a hydrocarbon radical and $x$ is an integer of 1 to 4, such that the R group has a valence equal to $x$ and contains 1 to 20 carbon atoms per molecule, and the reaction product thereof is represented by said (I), wherein said reaction employs a ratio of about 0.95 to 1.05 gram equivalents of lithium per gram mole of alkenol, and said reaction is conducted at a temperature of about 0° to 100° C. in a hydrocarbon diluent.

6. A process according to claim 5 wherein said hydrocarbon lithium compound is selected from the group consisting of methyllithium, isopropyllithium, n-butyllithium, tert-butyllithium, n-decyllithium, phenyllithium, p-tolyllithium, cyclohexyllithium, 1,20-dilithioeicosane, 1,3,5-trilithiopentane, and 1,2,4,6-tetralithiocyclohexane.

7. A process according to claim 1 wherein said lithium alkenoxide is selected from among the lithium salts of allyl alcohol, methallyl alcohol, 1-penten-3-ol, 3-buten-2-ol, 2,3-dimethyl-3-buten-2-ol, 1-undecen-3-ol, 1,1-diphenyl-2-propen-1-ol, 2-phenyl-2-propen-1-ol, 3-phenyl-1-penten-3-ol, 1-hexen-3-ol, 3,4,4-trimethyl-1-penten-3-ol, 2,6-dimethyl-1-octen-3-ol, 2-benzyl-1-phenyl-3-buten-2-ol, and 2-cyclopropyl-3-buten-2-ol.

8. A process according to claim 1 wherein said conjugated diene is selected from the group consisting of 1,3-butadiene, isoprene, piperylene, 2,3-dimethylbutadiene, 1,3-hexadiene, 2,4-octadiene, and 2-phenyl-1,3-butadiene.

9. A process according to claim 1 employing said monovinyl-substituted aromatic hydrocarbon, and wherein said monovinyl-substituted aromatic hydrocarbon is selected from the group consisting of styrene, alpha-methylstyrene, m-vinyltoluene, p-tert-butylstyrene, 1-vinylnaphthalene, 4-ethyl-1-vinylnaphthalene, 6-isopropyl-4-methyl-1-vinylnaphthalene, 4-cyclohexylstyrene, 4-dodecylstyrene, and 2-ethyl-4-benzylstyrene.

10. A process according to claim 1 wherein said lithium alkenoxide is employed in a range of about 1 to 4 parts by weight per 100 parts of total monomer employed in said polymerization.

11. A process according to claim 1 wherein said lithium initiator is represented by the formula $R''(Li)_y$ wherein said $R''$ is a multivalent hydrocarbon radical having the valence of y, y is an integer of 2 to 4, and wherein said polymerization is conducted in a hydrocarbon diluent, at a temperature in the range of about $-50°$ to $200°$ C., under a pressure sufficient to maintain reactants and diluents substantially in the liquid phase.

12. A process according to claim 11 wherein said lithium initiator is selected from the group consisting of 1,4-dilithiobutane, 1,2-dilithio-1,2-diphenylethane, 1,4-dilithionaphthalene, 1,4-dilithio-2-methylbutane, 1,3,5-trilithiopentane, 1,2,4,8-tetralithioeicosane, and lithium-methylnaphthalene-isoprene adducts.

13. A process according to claim 1 wherein said alkylene oxide contains 2 to 6 carbon atoms per molecule, and is employed in a range of about 1 to 2 mols of a said alkylene oxide per equivalent of lithium employed in said lithium-based initiator.

14. A process according to claim 13 wherein said alkylene oxide is ethylene oxide or propylene oxide, and is employed in the range of about 1.25 to 1.5 mols per equivalent of lithium employed in said initiator.

15. A process according to claim 13 wherein prior to addition of said alkylene oxide, about 2 to 20 parts by weight per 100 parts by weight of total monomers employed in said polymerization is employed of an ether effective to maintain a fluid system, and thereafter said alkylene oxide is employed.

16. A process according to claim 1 wherein said polyisocyanate is represented by the general formula $R'''(NCO)_z$ wherein $R'''$ is a hydrocarbon radical of a valence of z, contains 1 to 20 carbon atoms per molecule, and z is an integer of 2 to 4, wherein said polyisocyanate is employed in the range of about 1 to 1.5 equivalents of isocyanate per equivalent of total hydroxy including polymer hydroxy plus polyol hydroxy, wherein said polyol is employed in an amount ranging up to about 5 equivalents of hydroxy in said polyol per equivalent of polymer-hydroxy group, and wherein said treatment with said polyisocyanate is conducted at an effective temperature up to about 100° C.

17. A process according to claim 16 wherein said polyisocyanate is 2,4-tolylene diisocyanate, diphenylmethane diisocyanate, or hexamethylene diisocyanate.

18. A process according to claim 17 wherein said polyol is selected from the group consisting of 1,4-butanediol, 2-ethyl-1,3-hexanediol, trimethylolpropane, triisopropanolamine, N,N-bis(2-hydroxypropyl)aniline, and 3,3'-dichlorobenzidine.

19. A process according to claim 18 further employing in conjunction with said polyisocyanate an accelerator which is dibutyltin dilaurate, stannous octoate or triethylene diamine, employed in an amount ranging up to about 0.5 part by weight per 100 parts by weight of polymer.

20. A process according to claim 19 wherein said molding is conducted at a temperature in the range of about 200 to 250° F. at a pressure of about 15,000 to 20,000 psig.

21. A process according to claim 20 wherein said conjugated diene is 1,3-butadiene, said lithium initiator is a lithium-methylnaphthalene-isoprene adduct, said alkylene oxide is propylene oxide, said lithium alkenoxide is a lithium salt of allyl alcohol, said polyisocyanate is 2,4-tolylene diisocyanate, and said polyol is N,N-bis(2-hydroxypropyl)aniline.

22. A molded product prepared by the process which comprises the steps of:
(a) copolymerizing (A) at least one polymerizable hydrocarbon conjugated diene, or at least one polymerizable hydrocarbon conjugated diene with at least one polymerizable hydrocarbon monovinyl-substituted aromatic compound monomer, with (B) at least one polymerizable lithium alkenoxide comonomer, under solution polymerization conditions including polymerization temperatures and pressures employing a hydrocarbon lithium initiator, wherein said lithium alkenoxide comonomer is employed in the range of about 0.1 to 6 parts by weight per 100 parts by weight of total monomers, and wherein said hydrocarbon lithium initiator is employed in a range of about 20 to 150 milliequivalents of lithium per 100 parts by weight of total monomers, thereby preparing a normally liquid copolymer,
(b) treating said normally liquid copolymer from said step (a) with an effective amount of an alkylene oxide,
(c) treating said liquid alkylene oxide treated copolymer with an effective amount of one or more of water, acid, or lower alcohol, thereby preparing a hydroxy functional liquid polymer,
(d) partially curing said hydroxy functional liquid polymer with a polyisocyanate curing system, and
(e) molding said polyisocyanate-cured polymer at effective temperatures and pressures, thereby producing a molded product.

23. The molded product according to claim 22 wherein said lithium alkenoxide comonomer is represented by

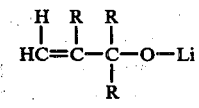

wherein each R is hydrogen, or is a hydrocarbon radical containing 1 to 8 carbon atoms, and wherein said conjugated diene monomer contains 4 to 12 carbon atoms per molecule, and where present said monovinyl-substituted aromatic compound monomer contains 8 to 20 carbon atoms per molecule.

24. The molded product according to claim 22 wherein said lithium alkenoxide comonomer is charged to said solution polymerization at least one prior to initiation, prior to substantial completion of said polymerization, or added terminally after polymerization of said conjugated diene or of said conjugated diene and monovinyl-substituted aromatic hydrocarbon monomer.

25. The molded product according to claim 22 wherein said lithium alkenoxide comonomer is added terminally after polymerization of other monomer or monomers and prior to termination of lithium activity.

26. The molded product according to claim 22 wherein said hydrocarbon lithium initiator is selected from the group consisting of methyllithium, isopropyllithium, n-butyllithium, tert-butyllithium, n-decyllithium, phenyllithium, p-tolyllithium, cyclohexyllithium, 1,20-dilithioeicosane, 1,3,5-trilithiopentane, and 1,2,4,6-tetralithiocyclohexane.

27. The molded product according to claim 23 wherein said lithium alkenoxide is selected from among the lithium salts of allyl alcohol, methallyl alcohol, 1-penten-3-ol, 3-buten-2-ol, 2,3-dimethyl-3-buten-2-ol, 1-undecen-3-ol, 1,1-diphenyl-2-propen-1-ol, 2-phenyl-2-propen-1-ol, 3-phenyl-1-penten-3-ol, 1-hexen-3-ol, 3,4,4-trimethyl-1-penten-3-ol, 2,6-dimethyl-1-octen-3-ol, 2-benzyl-1-phenyl-3-buten-2-ol, and 2-cyclopropyl-3-buten-2-ol.

28. The molded product according to claim 22 wherein said (A) is said conjugated diene and is selected from the group consisting of 1,3-butadiene, isoprene, piperylene, 2,3-dimethylbutadiene, 1,3-hexadiene, 2,4-octadiene, and 2-phenyl-1,3-butadiene.

29. The molded product according to claim 22 wherein said (A) is said conjugated diene with said monovinyl-substituted aromatic hydrocarbon, wherein said monovinyl-substituted aromatic compound is selected from the group consisting of styrene, alphamethylstyrene, m-vinyltoluene, p-tert-butylstyrene, 1-vinylnaphthalene, 4-ethyl-1-vinylnaphthalene, 6-isopropyl-4-methyl-1-vinylnaphthalene, 4-cyclohexylstyrene, 4-dodecylstyrene, and 2-ethyl-4-benzylstyrene.

30. The molded product according to claim 22 wherein said alkylene oxide contains 2 to 6 carbon atoms per molecule, and is employed in a range of about 1 to 2 mols of a said alkylene oxide per equivalent of lithium employed in said lithium-based initiator.

31. The molded product according to claim 30 wherein said alkylene oxide is ethylene oxide or propylene oxide, and is employed in the range of about 1.25 to 1.5 mols per equivalent of lithium employed in said initiator.

32. The molded product according to claim 22 wherein said polyisocyanate is represented by the general formula R'''(NCO)$_z$ wherein R''' is a hydrocarbon radical of a valence of z, contains 1 to 20 carbon atoms per molecule, and z is an integer of 2 to 4, and wherein said treatment with said polyisocyanate is conducted at an effective temperature up to about 100° C.

33. The molded product according to claim 32 wherein said polyisocyanate is 2,4-tolylene diisocyanate, diphenylmethane diisocyanate, or hexamethylene diisocyanate.

34. The molded product according to claim 33 wherein said polyisocyanate curing system includes a polyol chain extender, and said polyisocyanate is employed in the range of about 1 to 1.5 equivalents of isocyanate per equivalent of total hydroxy including polymer-hydroxy plus polyol hydroxy, wherein said polyol is employed in an amount ranging up to about 5 equivalents of hydroxy in said polyol per equivalent of polymer-hydroxy group.

35. The molded product according to claim 34 wherein said polyol chain extender is selected from the group consisting of 1,4-butanediol, 2-ethyl-1,3-hexanediol, trimethylolpropane, triisopropanolamine, N,N-bis(2-hydroxypropyl)aniline, and 3,3'-dichlorobenzidine.

36. The molded product according to claim 35 further employing in conjunction with said polyisocyanate an accelerator which is dibutyltin dilaurate, stannous octoate, or triethylene diamine, employed in an amount ranging up to about 0.5 part by weight per 100 parts by weight of polymer.

37. The molded product according to claim 36 wherein said molding is conducted at a temperature in the range of about 200° to 250° F. at a pressure of about 15,000 to 20,000 psig.

38. The molded product according to claim 37 wherein said conjugated diene is 1,3-butadiene, said lithium initiator is a lithium-methylnaphthalene-isoprene adduct, said alkylene oxide is propylene oxide, said lithium alkenoxide is a lithium salt of allyl alcohol, said polyisocyanate is 2,4-tolylene diisocyanate, and said polyol is N,N-bis(2-hydroxypropyl)aniline.

39. A process which comprises the steps of:
(a) copolymerizing (A) at least one polymerizable hydrocarbon conjugated diene, or at least one polymerizable hydrocarbon conjugated diene with at least one polymerizable hydrocarbon monovinyl-substituted aromatic compound monomer, with (B) at least one polymerizable lithium alkenoxide comonomer, under solution polymerization conditions including polymerization temperatures and pressures employing a hydrocarbon lithium initiator, wherein said lithium alkenoxide comonomer is employed in the range of about 0.1 to 6 parts by weight per 100 parts by weight of total monomers, and wherein said hydrocarbon lithium initiator is employed in a range of about 20 to 150 milliequivalents of lithium per 100 parts by weight of total monomers, thereby preparing a normally liquid copolymer,
(b) treating said normally liquid copolymer from said step (a) with an effective amount of an alkylene oxide,
(c) treating said liquid alkylene oxide treated copolymer from said step (b) with an effective amount of one or more of water, acid, or lower alcohol, thereby preparing a hydroxy functional liquid copolymer, and
(d) partially curing said hydroxy functional liquid polymer with a polyisocyanate/polyol curing system.

40. A process according to claim 39 wherein said lithium alkenoxide comonomer is represented by

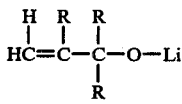

(I)

wherein each R is hydrogen, or is a hydrocarbon radical containing 1 to 8 carbon atoms, and is alkyl, cycloalkyl, aryl, or a combination thereof, said conjugated diene monomer contains 4 to 12 carbon atoms per molecule, and, where present, said monovinyl-substituted aromatic compound monomer contains 8 to 20 carbon atoms per molecule.

41. A process according to claim 39 wherein said lithium alkenoxide comonomer is charged to said solution polymerization at least one of prior to initiation, prior to substantial completion of said polymerization, or added terminally after polymerization of said conjugated diene or of said conjugated diene and monovinyl-substituted aromatic hydrocarbon monomer.

42. A process according to claim 41 wherein said lithium alkenoxide comonomer is added terminally after polymerization of other monomer or monomers and prior to termination of lithium activity.

43. A process according to claim 40 wherein said lithium alkenoxide is prepared in situ by reacting an alkenol with lithium metal or with a hydrocarbon lithium compound R'(Li)$_x$ wherein R is a hydrocarbon radical and $x$ is an integer of 1 to 4, such that the R group has a valence equal to $x$ and contains 1 to 20 carbon atoms per molecule, and the reaction product thereof is represented by said (I), wherein said reaction employs a ratio of about 0.95 to 1.05 gram equivalents of lithium per gram mole of alkenol, and said reaction is conducted at a temperature of about 0° to 100° C. in a hydrocarbon diluent.

44. A process according to claim 43 wherein said hydrocarbon lithium compound is selected from the group consisting of methyllithium, isopropyllithium, n-butyllithium, tert-butyllithium, n-decyllithium, phenyllithium, p-tolyllithium, cyclohexyllithium, 1,20-dilithioeicosane, 1,3,5-trilithiopentane, and 1,2,4,6-tetralithiocyclohexane.

45. A process according to claim 39 wherein said lithium alkenoxide is selected from among the lithium salts of allyl alcohol, methallyl alcohol, 1-penten-3-ol, 3-buten-2-ol, 2,3-dimethyl-3-buten-2-ol, 1-undecen-3-ol, 1,1-diphenyl-2-propen-1-ol, 2-phenyl-2-propen-1-ol, 3-phenyl-1-penten-3-ol, 1-hexen-3-ol, 3,4,4-trimethyl-1-penten-3-ol, 2,6-dimethyl-1-octen-3-ol, 2-benzyl-1-phenyl-3-buten-2-ol, and 2-cyclopropyl-3-buten-2-ol.

46. A process according to claim 39 wherein said conjugated diene is selected from the group consisting of 1,3-butadiene, isoprene, piperylene, 2,3-dimethylbutadiene, 1,3-hexadiene, 2,4-octadiene, and 2-phenyl-1,3-butadiene.

47. A process according to claim 39 employing said monovinyl-substituted aromatic hydrocarbon and wherein said monovinyl-substituted aromatic hydrocarbon is selected from the group consisting of styrene, alpha-methylstyrene, m-vinyltoluene, p-tert-butylstyrene, 1-vinylnaphthalene, 4-ethyl-1-vinylnaphthalene, 6-isopropyl-4-methyl-1-vinylnaphthalene, 4-cyclohexylstyrene, 4-dodecylstyrene, and 2-ethyl-4-benzylstyrene.

48. A process according to claim 39 wherein said lithium alkenoxide is employed in a range of about 1 to 4 parts by weight per 100 parts of total monomer employed in said polymerization.

49. A process according to claim 39 wherein said lithium initiator is represented by the formula R"(Li)$_y$ wherein said R" is a multivalent hydrocarbon radical having the valence of $y$, $y$ is an integer of 2 to 4, and wherein said polymerization is conducted in a hydrocarbon diluent, at a temperature in the range of about $-50°$ to 200° C, under a pressure sufficient to maintain reactants and diluents substantially in the liquid phase.

50. A process according to claim 49 wherein said lithium initiator is selected from the group consisting of 1,4-dilithiobutane, 1,2-dilithio-1,2-diphenylethane, 1,4-dilithionaphthalene, 1,4-dilithio-2-methylbutane, 1,3,5-trilithiopentane, 1,2,4,8-tetralithioeicosane, and lithium-methylnaphthalene-isoprene adducts.

51. A process according to claim 39 wherein said alkylene oxide contains 2 to 6 carbon atoms per molecule, and is employed in a range of about 1 to 2 mols of a said alkylene oxide per equivalent of lithium employed in said lithium-based initiator.

52. A process according to claim 51 wherein said alkylene oxide is ethylene oxide or propylene oxide, and is employed in the range of about 1.25 to 1.5 mols per equivalent of lithium employed in said initiator.

53. A process according to claim 51 wherein prior to addition of said alkylene oxide, about 2 to 20 parts by weight per 100 parts by weight of total monomers employed in said polymerization of an ether is employed effective to maintain a fluid system, and thereafter said alkylene oxide is employed.

54. A process according to claim 39 wherein said polyisocyanate is represented by the general formula R'''(NCO)$_z$ wherein R''' is a hydrocarbon radical of a valence of $z$, contains 1 to 20 carbon atoms per molecule, $z$ is an integer of 2 to 4, and wherein said polyisocyanate is employed in the range of about 1 to 1.5 equivalents of isocyanate per equivalent of total hydroxy including polymer-hydroxy plus polyol hydroxy, wherein said polyol is employed in an amount ranging up to about 5 equivalents of hydroxy in said polyol per equivalent of polymer-hydroxy group, and wherein said treatment with said polyisocyanate is conducted at an effective temperature up to about 100° C.

55. A process according to claim 54 wherein said polyisocyanate is 2,4-tolylene diisocyanate, diphenylmethane diisocyanate, or hexamethylene diisocyanate.

56. A process according to claim 55 wherein said polyol chain extender is selected from the group consisting of 1,4-butanediol, 2-ethyl-1,3-hexanediol, trimethylolpropane, triisopropanolamine, N,N-bis(2-hydroxypropyl)aniline, and 3,3'-dichlorobenzidine.

57. A process according to claim 56 further employing in conjunction with said polyisocyanate an accelerator which is dibutyltin dilaurate, stannous octoate or triethylene diamine, employed in an amount ranging up to about 0.5 part by weight per 100 parts by weight of polymer.

58. A process according to claim 57 wherein said conjugated diene is 1,3-butadiene, said lithium initiator is a lithium-methylnaphthalene-isoprene adduct, said alkylene oxide is propylene oxide, said lithium alkenoxide is a lithium salt of allyl alcohol, said polyisocyanate is 2,4-tolylene diisocyanate, and said polyol is N,N-bis(2-hydroxypropyl)aniline.

59. A partially cured polymer prepared by the process which comprises the steps of:

(a) copolymerizing (A) at least one polymerizable hydrocarbon conjugated diene, or at least one polymerizable hydrocarbon conjugated diene with at least one polymerizable hydrocarbon monovinyl-substituted aromatic compound monomer, with (B) at least one polymerizable lithium alkenoxide comonomer, under solution polymerization conditions including polymerization temperatures and pressures employing a hydrocarbon lithium initiator, wherein said lithium alkenoxide comonomer is employed in the range of about 0.1 to 6 parts by weight per 100 parts by weight of total monomers, and wherein said hydrocarbon lithium initiator is employed in a range of about 20 to 150 milliequivalents of lithium per 100 parts by weight of total monomers, thereby preparing a normally liquid copolymer, (b) treating said normally liquid copolymer from said step (a) with an effective amount of an alkylene oxide, (c) treating said liquid alkylene oxide treated copolymer with an effective amount of one or more of water, acid, or lower alcohol, thereby preparing a hydroxy functional liquid polymer, and (d) partially curing said hydroxy functional liquid polymer with a polyisocyanate curing system, thereby producing a partially cured polymer.

60. The partially cured polymer according to claim 59 wherein said lithium alkenoxide comonomer is represented by

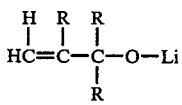

wherein each R is hydrogen, or is a hydrocarbon radical containing 1 to 8 carbon atoms, wherein said conjugated diene monomer contains 4 to 12 carbon atoms per molecule, and where present said monovinyl-substituted aromatic compound monomer contains 8 to 20 carbon atoms per molecule.

61. The partially cured polymer according to claim 59 wherein said lithium alkenoxide comonomer is charged to said solution polymerization at least one prior to initiation, prior to substantial completion of said polymerization, or added terminally after polymerization of said conjugated diene or of said conjugated diene and monovinyl-substituted aromatic hydrocarbon monomer.

62. The partially cured polymer according to claim 59 wherein said lithium alkenoxide comonomer is added terminally after polymerization of other monomer or monomers and prior to termination of lithium activity.

63. The partially cured polymer according to claim 59 wherein said hydrocarbon lithium initiator is selected from the group consisting of methyllithium, isopropyllithium, n-butyllithium, tert-butyllithium, n-decyllithium, phenyllithium, p-tolyllithium, cyclohexyllithium, 1,20-dilithioeicosane, 1,3,5-trilithiopentane, and 1,2,4,6-tetralithiocyclohexane.

64. The partially cured polymer according to claim 60 wherein said lithium alkenoxide is selected from among the lithium salts of allyl alcohol, methallyl alcohol, 1-penten-3-ol, 3-buten-2-ol, 2,3-dimethyl-3-buten-2-ol, 1-undecen-3-ol, 1,1-diphenyl-2-propen-1-ol, 2-phenyl-2-propen-1-ol, 3-phenyl-1-penten-3-ol, 1-hexen-3-ol, 3,4,4-trimethyl-1-penten-3-ol, 2,6-dimethyl-1-octen-3-ol, 2-benzyl-1-phenyl-3-buten-2-ol, and 2-cyclopropyl-3-buten-2-ol.

65. The partially cured polymer according to claim 59 wherein said (A) is said conjugated diene and is selected from the group consisting of 1,3-butadiene, isoprene, piperylene, 2,3-dimethylbutadiene, 1,3-hexadiene, 2,4-octadiene, and 2-phenyl-1,3-butadiene.

66. The partially cured polymer according to claim 59 wherein said (A) is said conjugated diene with said monovinyl-substituted aromatic hydrocarbon wherein said monovinyl-substituted aromatic compound is selected from the group consisting of styrene, alphamethylstyrene, m-vinyltoluene, p-tert-butylstyrene, 1-vinylnaphthalene, 4-ethyl-1-vinylnaphthalene, 6-isopropyl-4-methyl-1-vinylnaphthalene, 4-cyclohexylstyrene, 4-dodecylstyrene, and 2-ethyl-4-benzylstyrene.

67. The partially cured polymer according to claim 59 wherein said alkylene oxide contains 2 to 6 carbon atoms per molecule, and is employed in a range of about 1 to 2 mols of a said alkylene oxide per equivalent of lithium employed in said lithium-based initiator.

68. The partially cured polymer molded product according to claim 67 wherein said alkylene oxide is ethylene oxide or propylene oxide, and is employed in the range of about 1.25 to 1.5 mols per equivalent of lithium employed in said initiator.

69. The partially cured polymer according to claim 60 wherein said polyisocyanate is represented by the general formula $R'''(NCO)_z$ wherein $R'''$ is a hydrocarbon radical of a valence of $z$, contains 1 to 20 carbon atoms per molecule, $z$ is an integer of 2 to 4, wherein said treatment with said polyisocyanate is conducted at an effective temperature up to about 100° C.

70. The partially cured polymer according to claim 69 wherein said polyisocyanate is 2,4-tolylene diisocyanate, diphenylmethane diisocyanate, or hexamethylene diisocyanate.

71. The partially cured polymer according to claim 70 wherein said polyisocyanate curing system includes a polyol chain extender, and said polyisocyanate is employed in the range of about 1 to 1.5 equivalents of isocyanate per equivalent of total hydroxy including polymer-hydroxy plus polyol hydroxy, wherein said polyol is employed in an amount ranging up to about 5 equivalents of hydroxy in said polyol per equivalent of polymer-hydroxy group.

72. The partially cured polymer according to claim 71 wherein said polyol chain extender is selected from the group consisting of 1,4-butanediol, 2-ethyl-1,3-hexanediol, trimethylolpropane, triisopropanolamine, N,N-bis(2-hydroxypropyl)aniline, and 3,3'-dichlorobenzidine.

73. The partially cured polymer according to claim 72 further employing in conjunction with said polyisocyanate an accelerator which is dibutyltin dilaurate, stannous octoate, or triethylene diamine, employed in an amount ranging up to about 0.5 part by weight per 100 parts by weight of polymer.

74. The partially cured polymer according to claim 73 wherein said conjugated diene is 1,3-butadiene, said lithium initiator is a lithium-methylnaphthalene-isoprene adduct, said alkylene oxide is propylene oxide, said lithium alkenoxide is a lithium salt of allyl alcohol, said polyisocyanate is 2,4-tolylene diisocyanate, and said polyol is N,N-bis(2-hydroxypropyl)aniline.

75. The process which comprises the steps of:
(a) copolymerizing in admixture (A) at least one polymerizable hydrocarbon conjugated diene or at least one polymerizable hydrocarbon conjugated diene with at least one polymerizable hydrocarbon monovinyl-substituted aromatic compound monomer, and (B) at least one polymerizable lithium alkenoxide comonomer, under solution polymerization conditions including polymerization temperatures and pressures employing a hydrocarbon lithium initiator, wherein said lithium alkenoxide comonomer is employed in the range of about 0.1 to 6 parts by weight per 100 parts by weight of total monomers, and wherein said hydrocarbon lithium initiator is employed in the range of about 20 to 150 milliequivalents of lithium per 100 parts by weight of total monomers, thereby preparing a normally liquid copolymer, (b) treating said normally liquid copolymer with an effective amount of an alkylene oxide, (c) treating said liquid alkylene oxide-treated copolymer with an effective amount of one or more of water, acid, or lower alcohol, thereby preparing a hydroxyfunctional liquid copolymer, and (d) partially curing said hydroxyfunctional liquid copolymer with a polyisocyanate/polyol curing system, thereby producing a partially cured polymer suitable for molding to a molded product.

76. The process according to claim 75 wherein said (A) is a polymerizable hydrocarbon conjugated diene and is butadiene;

said (B) is the product of reaction of allyl alcohol with n-butyllithium;

said hydrocarbon lithium initiator is a lithium-methyl-naphthalene-isoprene adduct; and said alkylene oxide is propylene oxide.

* * * * *

UNITED STATES PATENT AND TRADEMARK OFFICE
CERTIFICATE OF CORRECTION

PATENT NO. : 4,111,915
DATED : September 5, 1978
INVENTOR(S) : Charles M. Selman It is certified that error appears in the above-identified patent and that said Letters Patent are hereby corrected as shown below:

(Claim 2) Column 14, formula after line 26 should read ---

$$\begin{matrix} & H & R & R \\ & | & | & | \\ HC & = & C - C - O - Li \\ & & | \\ & & R \end{matrix}$$

---; (Claim 5) lines 55 and 56, in both instances "R" should read --- R' ---.

(Claim 43) Column 19, lines 28 and 29, both "R"'s should be --- R' ---.

Signed and Sealed this

Third Day of April 1979

[SEAL]

Attest:

RUTH C. MASON
*Attesting Officer*

DONALD W. BANNER
*Commissioner of Patents and Trademarks*